United States Patent [19]

Okamoto et al.

[11] Patent Number: 4,895,035
[45] Date of Patent: Jan. 23, 1990

[54] DEVICE FOR SUPPORTING PINION SHAFT OF ELECTRIC MOTOR FOR STARTING ENGINE

[75] Inventors: Kyoichi Okamoto; Kazuo Takami, both of Hyogo, Japan

[73] Assignee: Mitsubishi Denki Kabushiki Kaisha, Tokyo, Japan

[21] Appl. No.: 171,951

[22] Filed: Mar. 23, 1988

[30] Foreign Application Priority Data

Mar. 26, 1987 [JP] Japan .................. 62-45224

[51] Int. Cl.⁴ .................. F02N 15/06; F16J 15/32; F16C 21/00
[52] U.S. Cl. .................. 74/7 A; 74/7 R; 184/5; 277/152; 384/13; 384/16; 384/25; 384/486
[58] Field of Search .......... 74/6, 7 R, 7 A, 7 C, 74/7 E; 184/5; 290/38 A; 384/13, 16, 25, 147, 486; 277/152

[56] References Cited

U.S. PATENT DOCUMENTS

| | | | |
|---|---|---|---|
| 1,246,718 | 11/1917 | Conrad | 290/38 A |
| 2,618,264 | 11/1952 | Bloxsom | 384/13 X |
| 2,736,585 | 2/1956 | Riesing | 277/153 |
| 2,776,173 | 1/1957 | Rudy | 384/13 |
| 2,968,498 | 1/1961 | Saunders | 277/152 |
| 3,399,575 | 9/1968 | Seilly et al. | 74/7 R |
| 4,093,241 | 6/1978 | Muntjanoff et al. | 277/152 X |
| 4,312,547 | 1/1982 | Negele et al. | 384/486 |
| 4,592,243 | 6/1986 | Katoh et al. | 74/7 E |

FOREIGN PATENT DOCUMENTS

| | | |
|---|---|---|
| 321138 | 5/1920 | Fed. Rep. of Germany . |
| 2551041 | 8/1976 | Fed. Rep. of Germany . |
| 3326586 | 2/1985 | Fed. Rep. of Germany . |
| 62-40274 | 3/1987 | Japan . |
| JP87/00729 | 10/1987 | PCT Int'l Appl. . |
| 786938 | 11/1957 | United Kingdom ......... 74/7 A |
| 1466733 | 3/1977 | United Kingdom ......... 277/152 |

Primary Examiner—Allan D. Herrmann
Attorney, Agent, or Firm—Wolf, Greenfield & Sacks

[57] ABSTRACT

A device for supporting an overhang type slidable pinion shaft of an electric motor for starting an engine comprises a bearing for supporting the pinion shaft, the bearing including an inner ring having a groove provided in its inner peripheral surface. Accordingly, it is possible to secure grease or oil in the groove provided in the inner peripheral surface of the inner ring of the bearing and it is therefore possible to minimize the boundary friction occurring between the inner peripheral surface of the inner ring of the bearing and the sliding surface of the pinion shaft and, at the same time, enable the pinion shaft to slide even more smoothly.

8 Claims, 2 Drawing Sheets

Fig. 4 PRIOR ART
Fig. 3
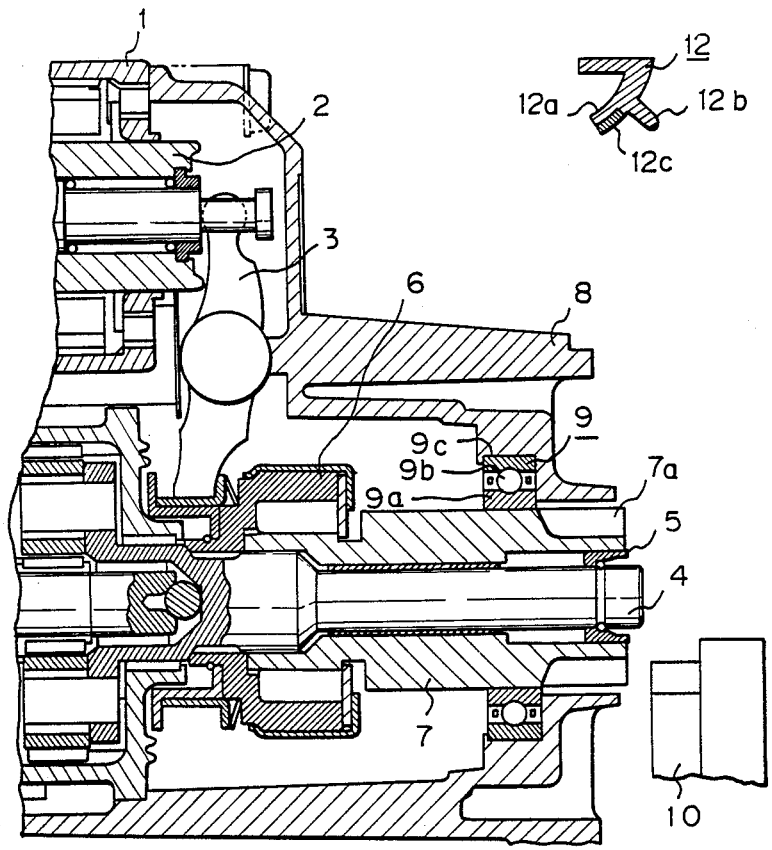
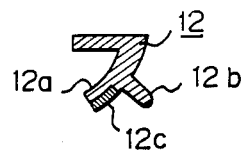
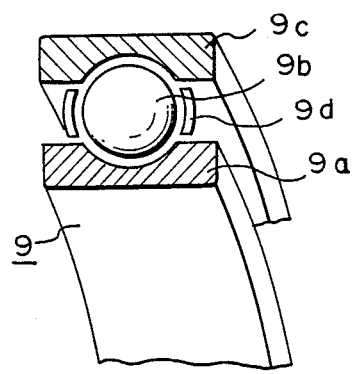
Fig. 5 PRIOR ART

DEVICE FOR SUPPORTING PINION SHAFT OF ELECTRIC MOTOR FOR STARTING ENGINE

BACKGROUND OF THE INVENTION

1. Field of the Invention

The present invention relates to a device for supporting an overhang type slidable pinion shaft of an electric motor for starting an engine.

2. Description of the Prior Art

A typical conventional device for supporting an overhang type slidable pinion shaft of an electric motor for starting an engine will first be explained with reference to FIGS. 4 and 5. FIG. 4 is a fragmentary sectional view showing an essential part of a starting motor, and FIG. 5 shows a bearing employed in the motor shown in FIG. 1. In the figures, the reference numeral 1 denotes a magnetic switch, 2 a plunger, 3 a lever, 4 a shaft, 5 a stopper, 6 a clutch, 7 a pinion shaft, 7a a pinion, 8 a bracket, and 9 a ball bearing press-fitted into the bracket 8, the bearing 9 consisting of an inner ring 9a, balls 9b, an outer ring 9c and a retainer 9d. The numeral 10 denotes a ring gear.

In operation, when a voltage is applied to the magnetic switch 1 to draw the plunger 2 into the body of the switch 1, the clutch 6 is shifted forward (rightward as viewed in FIG. 4) through the lever 3, thus causing the pinion shaft 7 to move forward while rotating with the outer peripheral portion thereof which is supported by the ball bearing 9. In this way, the pinion 7a is meshed with the ring gear 10 of the associated engine.

The above-described conventional device for supporting an overhang type slidable pinion shaft of an engine starting motor suffers, however, from the following problem. Namely, in order to ensure smooth sliding movement of the pinion shaft 7, a film of oil must be constantly present in the area between the outer peripheral surface of the sliding portion of the pinion shaft 7 and the inner peripheral surface of the inner ring 9a of the ball bearing 9. If the oil film should disappear during use, the pinion shaft 7 will lose its ability to slide smoothly and may fail to engage with the ring gear 10. In such a case, it would be impossible to start the engine.

SUMMARY OF THE INVENTION

In view of the above-described problem of the prior art, it is a primary object of the present invention to provide a device for supporting an overhang type slidable pinion shaft of an electric motor for starting an engine which enables the pinion shaft to slide smoothly at all times so that it is possible to start the engine without fail.

To this end, the present invention provides a device for supporting an overhang type slidable pinion shaft of an electric motor for starting an engine which comprises a bearing for supporting the pinion shaft, the bearing including an inner ring having a groove provided in its inner peripheral surface.

By virtue of the above-descibed arrangement, it is possible to secure grease or oil in the groove provided in the inner peripheral surface of the inner ring of the bearing and it is therefore possible to minimize the boundary friction occurring between the inner peripheral surface of the inner ring of the bearing and the sliding surface of the pinion shaft and, at the same time, enable the pinion shaft to slide even more smoothly.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which:

FIG. 3 is a sectional view of an oil seal employed in the second embodiment;

FIG. 4 is a fragmentary sectional view showing an essential part of a prior art; and FIG. 5 shows a bearing employed in the prior art shown in FIG. 4.

DESCRIPTION OF THE PREFERRED EMBODIMENTS

One embodiment of the present invention will be described hereinunder with reference to FIG. 1.

Figure 1:
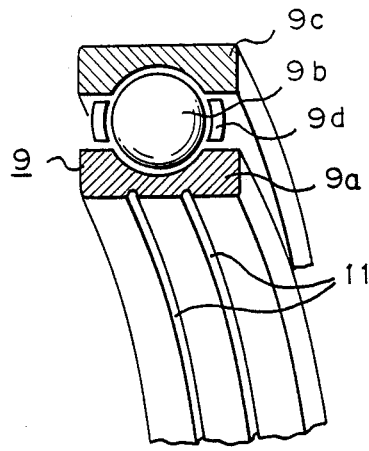
FIG. 1 shows a bearing employed in one embodiment of the present invention.

FIG. 1 shows a bearing employed in one embodiment of the present invention, in which the same elements or portions as those in the above-described prior art are denoted by the same reference numerals and description thereof is omitted. In FIG. 1, the reference numeral 11 denotes two annular grooves which are provided in the inner peripheral surface of an inner ring 9a of a ball bearing 9.

Provision of the grooves 11 in the inner peripheral surface of the inner ring 9a enables grease or oil to be assuredly maintained in the grooves 11. Therefore, it is possible to minimize the boundary friction occurring between the inner peripheral surface of the inner ring 9a and the sliding surface (outer peripheral surface) of the pinion shaft 7 and, at the same time, enable the pinion shaft 7 to slide even more smoothly.

Figure 2:
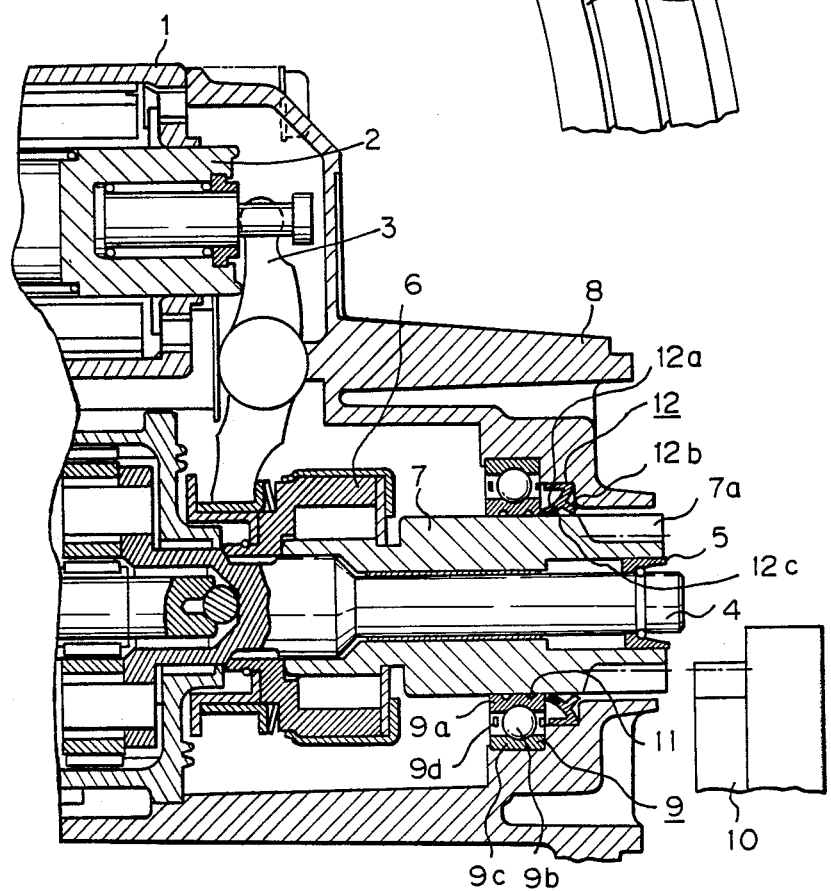
FIG. 2 is a fragmentary sectional view showing an essential part of another embodiment of the present invention.

Another embodiment of the present invention will next be described with reference to FIGS. 2 and 3. FIG. 2 is a fragmentary sectional view showing an essential part of the second embodiment, and FIG. 3 is a sectional view of an oil seal employed in the second embodiment. In these figures, elements or portions which are the same as those in the prior art and the first embodiment are denoted by the same reference numerals and description thereof is omitted. In FIGS. 2 and 3, the reference numeral 12 denotes an oil seal having two lips 12a and 12b. The lip 12a which serves as a main lip is coated with Teflon 12c.

If the oil seal 12 is provided in front of the ball bearing 9 in addition to the grooves 11 which serve as an oil reservoir provided in the inner peripheral surface of the inner ring 9a, grease gathers in the area defined between the two lips 12a, 12b and also in the area defined between the lip 12a and the outer edge of the inner ring 9a. Accordingly, a film of oil is formed even more effectively in the area of contact between the inner peripheral surface of the inner ring 9a and the sliding surface of the pinion shaft 7, so that it is possible to further reduce the boundary friction.

As has been described above, it is possible according to the present invention to prevent disappearance of the oil film during use and minimize wearing of the inner peripheral surface of the bearing by providing grooves in the inner peripheral surface of the inner ring of the bearing. Accordingly, the pinion shaft is able to slide smoothly at all times and, as a result, it becomes possible to eliminate any risk that the pinion shaft when projected may fail to mesh with the ring gear of the engine (i.e., so-called gear milling).

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. In an overhang-type starter having a housing with an opening therethrough, a shaft with an axis, a tubular pinion shaft with an axis coincident with said shaft axis, slidable over said shaft and being driven by said shaft, means for sliding said pinion shaft over said shaft through said housing opening and a ball bearing having an annular outer race mounted in said housing opening, an annular inner race through which said pinion shaft and said shaft slide and bearing balls located between said outer race and said inner race, the improvement wherein said bearing inner race has a surface facing said pinion shaft and said surface has at least one annular groove positioned perpendicularly to said pinion shaft axis, said groove holding lubricant which allows said pinion shaft to easily slide through said bearing inner race while said ball bearing allows said pinion shaft and said shaft to rotate freely.

2. In a overhang-type starter, the improvement as set forth in claim 1 wherein said surface has two parallel annular grooves for holding lubricant.

3. In a overhang-type starter, the improvement as set forth in claim 1 further comprising an oil seal disposed adjacent to said bearing, said oil seal and said ball bearing forming a cavity for holding lubricant.

4. In a overhang-type starter, the improvement as set forth in claim 3 wherein said housing has an interior and exterior and said oil seal is located on the side of said ball bearing facing said exterior of said housing.

5. In a overhang-type starter, the improvement as set forth in claim 4 wherein said oil seal has an outer periphery mounted in said housing and two annular lips which contact said pinion shaft.

6. In a overhang-type starter, the improvement as set forth in claim 5 wherein at least one of said two annular lips is coated with Teflon plastic at the point of contact with said pinion shaft.

7. An overhang-type starter comprising:
a housing having an interior and an exterior with an opening passing from said interior to said exterior;
a shaft with an axis;
a tubular pinion shaft with an axis coincident with said shaft axis, slidable over said shaft and being driven by said shaft;
means for sliding said pinion shaft over said shaft through said housing opening;
a ball bearing having an annular outer race mounted in said housing opening, an annular inner race through which said pinion shaft and said shaft slide and bearing balls located between said outer race and said inner race, wherein said bearing inner race has a surface facing said pinion shaft and said surface has two annular grooves positioned perpendicularly to said pinion shaft axis, each of said grooves holding lubricant which allows said pinion shaft to easily slide through said bearing inner race while said ball bearing allows said pinion shaft and said shaft to rotate freely;
an oil seal disposed adjacent to said bearing on the side of said ball bearing facing said exterior of said housing, said oil seal and said ball bearing forming a cavity for holding lubricant, said oil seal having an outer periphery mounted in said housing and two annular lips which contact said pinion shaft.

8. In a overhang-type starter, the improvement as set forth in claim 7 wherein at least one of said two annular lips is coated with Teflon plastic at the point of contact with said pinion shaft.

* * * * *